United States Patent
Eia

(10) Patent No.: US 8,662,170 B2
(45) Date of Patent: Mar. 4, 2014

(54) CUTTINGS TRANSFER SYSTEM

(75) Inventor: Jan Thore Eia, Kvernaland (NO)

(73) Assignee: M-I L.L.C., Houston, TX (US)

( * ) Notice: Subject to any disclaimer, the term of this patent is extended or adjusted under 35 U.S.C. 154(b) by 505 days.

(21) Appl. No.: 12/991,733

(22) PCT Filed: May 14, 2009

(86) PCT No.: PCT/US2009/043878
§ 371 (c)(1),
(2), (4) Date: Feb. 1, 2011

(87) PCT Pub. No.: WO2009/140450
PCT Pub. Date: Nov. 19, 2009

(65) Prior Publication Data
US 2011/0147087 A1 Jun. 23, 2011

Related U.S. Application Data

(60) Provisional application No. 61/053,544, filed on May 15, 2008.

(51) Int. Cl.
*E21B 43/40* (2006.01)
*C09K 8/02* (2006.01)
*E21B 21/06* (2006.01)

(52) U.S. Cl.
CPC .................................. *E21B 21/066* (2013.01)
USPC ............. 166/267; 175/66; 175/206; 175/207; 175/212

(58) Field of Classification Search
USPC .................... 166/267; 175/66, 206, 207, 212; 210/785, 384, 257.1, 258, 259
See application file for complete search history.

(56) References Cited

U.S. PATENT DOCUMENTS

| 3,527,413 | A | 9/1970 | Crowther |
| 5,913,372 | A | 6/1999 | Dietzen |
| 7,337,860 | B2 | 3/2008 | McIntyre |
| 2005/0074302 | A1* | 4/2005 | Burnett ........................ 406/56 |
| 2006/0102390 | A1* | 5/2006 | Burnett et al. .................. 175/66 |
| 2007/0131454 | A1 | 6/2007 | Hollier et al. |

FOREIGN PATENT DOCUMENTS

| CA | 2664850 A1 | 4/2008 |
| DE | 3902564 C1 | 1/1990 |
| EP | 1054135 A1 | 11/2000 |

OTHER PUBLICATIONS

Examiner's Report issued in corresponding Canadian Application No. 2,723,992; Dated Jul. 25, 2012 (3 pages).
International Search Report issued in PCT/US2009/043878, mailed on Dec. 30, 2009, 4 pages.
Written Opinion issued in PCT/US2009/043878, mailed on Dec. 30, 2009, 4 pages.
Extended European Search Report issued in corresponding European Application No. 09747533.9 dated Nov. 20, 2012 (7 pages).
Official Action issued in corresponding Mexican Application No. MX/a/2010/012335 with English reporting thereof dated May 22, 2013 (8 pages).

* cited by examiner

*Primary Examiner* — Cathleen Hutchins
(74) *Attorney, Agent, or Firm* — Osha Liang LLP

(57) ABSTRACT

A cuttings transfer system including a separator configured to separate cuttings from a slurry and a transfer line configured to receive the cuttings from the separator. The system further including a valve in fluid communication with the transfer line and the separator, wherein the valve is configured to control a flow of the cuttings from the separator to the transfer line, and an air transfer device coupled to the transfer line that is configured to supply a flow of air through the transfer line.

20 Claims, 6 Drawing Sheets

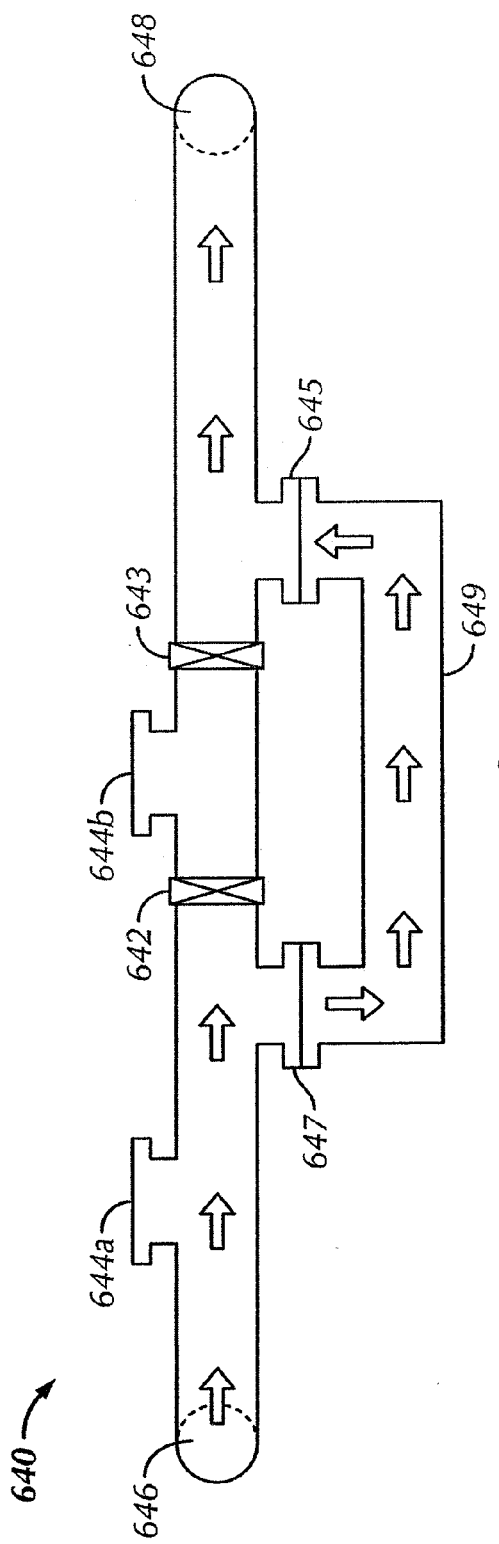
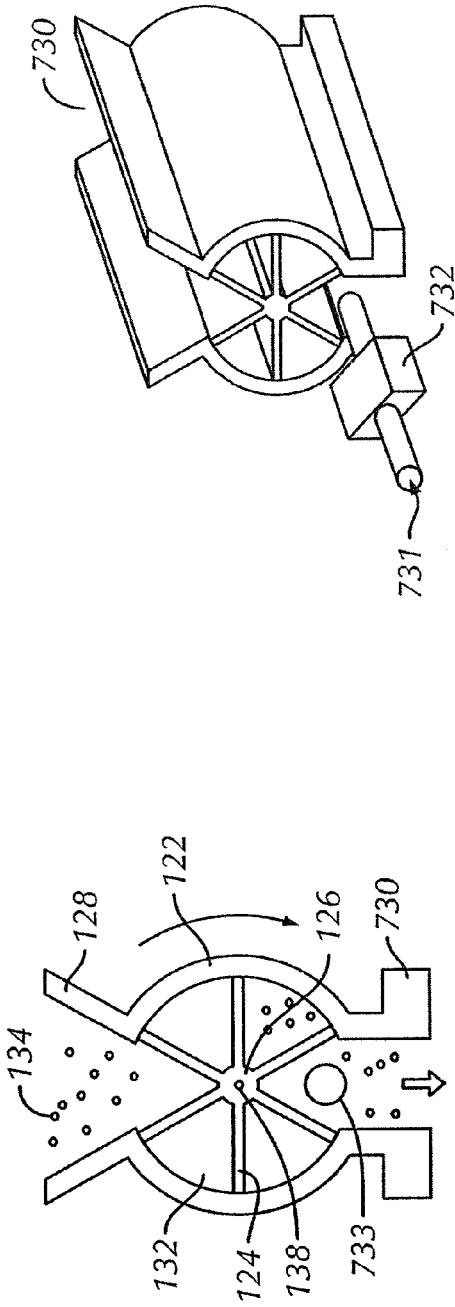

CUTTINGS TRANSFER SYSTEM

BACKGROUND

1. Field of the Disclosure

Embodiments disclosed herein relate generally to systems and methods for handling and disposing of drill cuttings from drilling operations. Specifically, embodiments disclosed herein relate to a cuttings transfer system for transferring drill cuttings discharged by a separator.

2. Background Art

Oilfield drilling fluid, often called "mud," serves multiple purposes in the industry. Among its many functions, the drilling mud acts as a lubricant to cool rotary drill bits and facilitate faster cutting rates. Typically, the mud is mixed at the surface and pumped downhole at high pressure to the drill bit through a bore of the drillstring. Once the mud reaches the drill bit, it exits through various nozzles and ports where it lubricates and cools the drill bit. After exiting through the nozzles, the "spent" fluid returns to the surface through an annulus formed between the drillstring and the drilled wellbore.

Furthermore, drilling mud provides a column of hydrostatic pressure, or head, to prevent "blow out" of the well being drilled. This hydrostatic pressure offsets formation pressures, thereby preventing fluids from blowing out if pressurized deposits in the formation are breached. Two factors contributing to the hydrostatic pressure of the drilling mud column are the height (or depth) of the column (i.e., the vertical distance from the surface to the bottom of the wellbore) itself and the density (or its inverse, specific gravity) of the fluid used. Depending on the type and construction of the formation to be drilled, various weighting and lubrication agents are mixed into the drilling mud to obtain the right mixture. Typically, drilling mud weight is reported in "pounds," short for pounds per gallon. Generally, increasing the amount of weighting agent solute dissolved in the mud base will create a heavier drilling mud. Drilling mud that is too light may not protect the formation from blow outs, and drilling mud that is too heavy may over invade the formation. Therefore, much time and consideration is spent to ensure the mud mixture is optimal. Because the mud evaluation and mixture process is time consuming and expensive, drillers and service companies prefer to reclaim the returned drilling mud and recycle it for continued use.

Another significant purpose of the drilling mud, which is also known as drilling fluid, is to carry the cuttings away from the drill bit at the bottom of the borehole to the surface. As a drill bit pulverizes or scrapes the rock formation at the bottom of the borehole, small pieces of solid material are left behind. The drilling fluid exiting the nozzles at the bit acts to stir-up and carry the solid particles of rock and formation to the surface within the annulus between the drillstring and the borehole. Therefore, the fluid exiting the borehole from the annulus is a slurry of formation cuttings in drilling fluid. Before the fluid can be recycled and re-pumped down through nozzles of the drill bit, the cuttings must be removed.

Apparatus in use today to remove cuttings from drilling fluid are commonly referred to in the industry as shale shakers or vibratory separators. A vibratory separator is a vibrating sieve-like table upon which returning solids laden drilling fluid is deposited and through which clean drilling fluid emerges. Typically, the vibratory separator is an angled table with a generally perforated filter screen bottom. Returning drilling fluid is deposited at the feed end of the vibratory separator. As the drilling fluid travels down the length of the vibrating table, the fluid falls through the perforations to a reservoir below, leaving the cuttings or solid particulates behind. The vibrating action of the vibratory separator table conveys cuttings left behind to a discharge end of the separator table. The cuttings may be oil based or water based. If they are water based cuttings they are usually discarded with out further treatment. If they are oil based cuttings they may have to be transported to another cleaning process. Typically, the transportation of cuttings away from the separator is accomplished by a mechanical auger, also known as a screw conveyor. The mechanical auger includes a tube and a helical shaped shaft. The helical shaped shaft is contained within the tube and configured to rotate. While the helical shaft rotates, it forces the cuttings to move in single direction, thereby transporting the cuttings through the tube.

Accordingly, there exists a need for a cuttings transfer system that transfers cuttings in a safe and efficient manner.

SUMMARY OF THE DISCLOSURE

In one aspect, embodiments disclosed herein relate to a cuttings transfer system including a separator configured to separate cuttings from a slurry and a transfer line configured to receive the cuttings from the separator. Additionally, the system includes a valve in fluid communication with the transfer line and the separator, wherein the valve is configured to control a flow of the cuttings from the separator to the transfer line, and an air transfer device coupled to the transfer line that is configured to supply a flow of air through the transfer line.

In another aspect, embodiments disclosed herein relate to a method of transferring cuttings at a drilling location, the method including transferring a return slurry from a wellbore, the slurry including a solids phase and a liquid phase. Additionally, the method includes separating the solids phase from the liquid phase, directing the solids phase into a valve, releasing the solids phase into a transfer line, creating a negative pressure inside the transfer line, and transporting the solids phase through the transfer line using the air flow.

In another aspect, embodiments disclosed herein relate to a method of transferring cuttings at a drilling location, the method including transferring a return slurry from a wellbore, the slurry including a solids phase and a liquid phase. Additionally, the method includes separating the solids phase from the liquid phase, directing the solids phase into a valve, releasing the solids phase into a transfer line, creating a positive pressure inside the transfer line, and transporting the solids phase through the transfer line using the air flow.

Other aspects and advantages of the invention will be apparent from the following description and the appended claims.

BRIEF DESCRIPTION OF DRAWINGS

FIG. 3 shows component view of a transfer line in accordance with embodiments of the present disclosure.

FIGS. 7A and 7B show front cross-section and isometric views of a blow-through valve in accordance with embodiments of the present disclosure.

DETAILED DESCRIPTION

In one aspect, embodiments disclosed herein relate generally to systems and methods for handling and disposing of cuttings from drilling operations. Specifically, embodiments disclosed herein relate to systems or methods for transferring cuttings discharged by a separator. More specifically, embodiments disclosed herein relate to a cuttings transfer system that uses a flow of air to transfer cuttings discharged by a separator through a transfer line. For example, in one embodiment, an air transfer device (e.g., a compressor) may be used to provide air to a transfer line by creating a positive pressure within the transfer line. In another embodiment, the air transfer device (e.g., a vacuum) may be used to pull air through the transfer line by creating a negative pressure within the transfer line.

Typically, drilling fluids used in drilling operations return from a wellbore as a slurry, which includes a liquid phase with a solid phase entrained therein. As used herein, "drill cuttings" or "cuttings" refer to solids removed from a wellbore while drilling. Upon return, the slurry may undergo any number of separation techniques (e.g., centrifugation, thermal desorption, and screening) to separate the cuttings from the slurry. Once the cuttings have been separated, the cuttings are discharged from a separator and transferred to a storage vessel, where they may be stored for eventual removal from the drill site.

Figure 1:
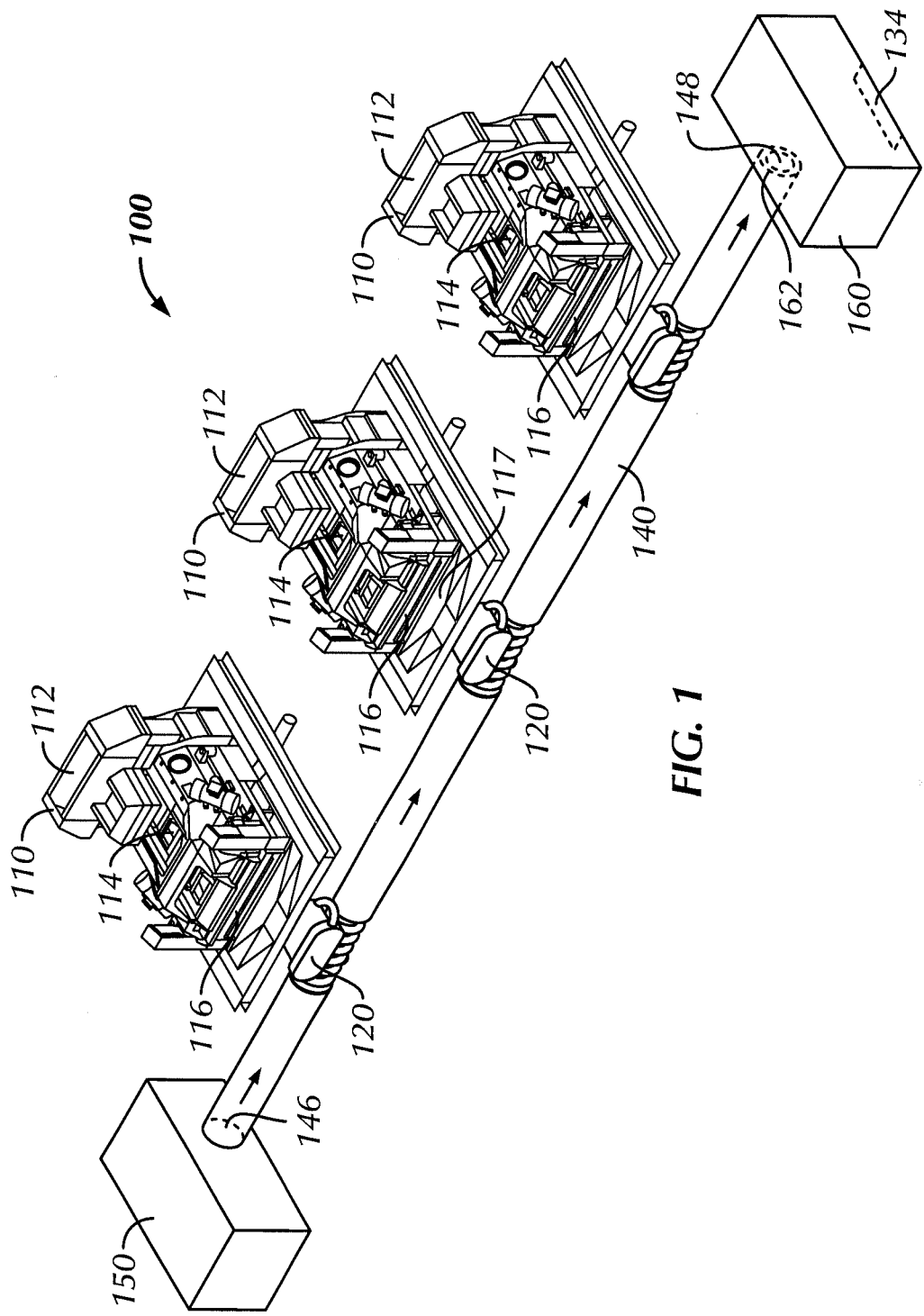
FIG. 1 shows a cuttings transfer system in accordance with embodiments of the present disclosure.

Referring to FIG. 1, a cuttings transfer system 100 in accordance with an embodiment of the present disclosure is shown. Cuttings transfer system 100 includes separators 110, valves 120, a transfer line 140, an air transfer device 150, and a storage vessel 160. The separators 110 are configured to receive a slurry including a liquid phase with a solid phase entrained therein. Further, separators 110 are configured to separate the cuttings from the slurry, and discharge the cuttings through valves 120 into transfer line 140.

In one embodiment, at least one of the separators 110 includes screens 114 that form a tray with the sidewalls of the separator 110. The slurry may be transferred from a wellbore and deposited on top of the screens 114 at a receiving end 112. The screens 114 may then be vibrated by one or more motors, such that the drill cuttings are separated from the drilling fluid. The drilling fluid and fine particles may then pass through screens 114 and be recovered underneath separator 110. Drill cuttings of a size greater than perforations in screen 114 migrate across the screens 114, where they are discharged at discharge end 116. Screens 114 typically include filtering elements (not illustrated) attached to a screen frame (not shown). The filtering elements define the largest solid particle capable of passing therethrough. Those of ordinary skill in the art will appreciate that in an alternate embodiment, the separators 110 may include other types of vibratory separators, centrifuge, thermal desorption units, hydrocyclones, and other apparatuses used to separate solids from a fluid. Once the cuttings are discharged from the separator 110, the cuttings will flow through valve 120, which is configured to transfer the cuttings to the transfer line 140.

Figure 2:
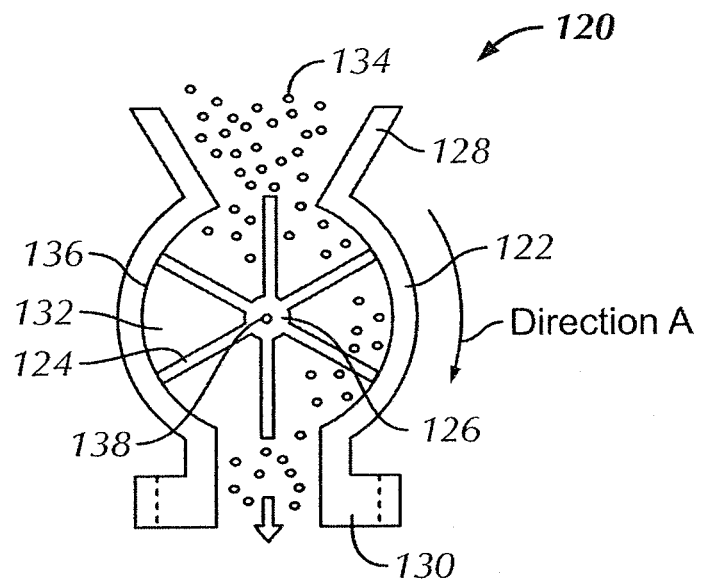
FIG. 2 shows a cross-sectional view of a valve in accordance with embodiments of the present disclosure.

Referring now to FIG. 2, a cross-sectional view of valve 120 in accordance with an embodiment of the present disclosure is shown. As illustrated, valve 120 includes a housing 122, vanes 124, a shaft 126, an upper inlet 128, and a lower outlet 130. The vanes 124 are coupled to the shaft 126, which is configured to rotate about an axis 138. In operation, the shaft 126 may be rotated by a motor (not shown), such that vanes 124 rotate about axis 138 in direction A. While the vanes 124 and shaft 126 rotate around axis 138, pockets 132 are formed between the vanes 124 and an inner wall 136 of housing 122. As such, pockets 132 are configured to provide a pathway for cuttings 134 to transfer from upper inlet 128 to lower outlet 130 of valve 120. Further, as shaft 126 and vanes 124 rotate, cuttings 134 within the pockets 132 are transferred to lower outlet 130. Those of ordinary skill in the art will appreciate that vanes 124 may be configured to allow a pressure differential to be sustained between the upper inlet 128 and the lower outlet 130. In certain aspects, vanes 124 may contact inner wall 136 of housing 122 while rotating, thereby creating a seal between upper inlet 128 and the lower outlet 130. In an alternate embodiment, one skilled in the art will appreciate that valve 120 may include a rotary feeder, or any other valve configured to control a flow of solids, while maintaining a pressure difference.

Referring now to FIGS. 1 and 2 together, lower outlet 130 of valve 120 is coupled to transfer line 140. One skilled in the art will appreciate that valve 120 may be coupled to transfer line 140 using threads, bolts, welding, or other attachment methods known in the art. Additionally, upper inlet 128 of valve 120 is in fluid communication with separator 110, and is thus configured to receive cuttings from separator 110. For example, when separator 110 discharges cuttings 134, the flow of cuttings 134 is directed into upper inlet 128 of valve 120. In one embodiment, the valve 120 may include a hopper 117 or other conduits known in the art that may direct cuttings into upper inlet 128.

Additionally, valve 120 is configured to control the flow of cuttings from the separator 110 to the transfer line 140. For example, cuttings 134 discharged from the separator 110 may flow through upper inlet 128 and be received by pockets 132 of valve 120. Shaft 126 and vanes 124 may then rotate, transferring the cuttings 134 to lower outlet 130 of valve 120, where cuttings 134 are released into an aperture in the transfer line 140. In one embodiment, the rate at which the cuttings 134 are released into transfer line 140 may be controlled by the rotational speed of the motor that is coupled to the shaft 126.

Referring specifically to FIG. 1, transfer line 140 includes at least a first opening 146, apertures (not shown), and a second opening 148. In this embodiment, transfer line 140 is coupled to multiple valves 120, and second opening 148 is in fluid communication with storage vessel 160. In this embodiment, first opening 146 is coupled to air transfer device 150. One skilled in the art will appreciate that transfer line 140 may include various cross-sectional geometries and dimensions. For example, transfer line 140 may include a square cross-section, a rectangular cross-section, an elliptical cross-section, or other geometries known in the art.

Transfer line 140 is configured to receive cuttings released by valve 120, and provide a flow path for the cuttings from separator 110 to storage vessel 160. For example, as valve 120 releases cuttings 134 through the lower outlet 130, the cuttings 134 flow through an aperture (not shown) into transfer line 140. Then, air flowing through transfer line 140 will force the cuttings 134 through transfer line 140 and into storage vessel 160.

Referring now to FIG. 3, in an alternate embodiment, the cuttings transfer system may include a transfer line 640 as an alternative to the transfer line 140 shown in FIG. 1. Similar to transfer line 140, transfer line 640 includes a first opening 646, a second opening 648, and apertures 644a, 644b. However, transfer line 640 further includes a front opening 645 and a back opening 647. As shown in FIG. 3, the front opening 645 is located in front of aperture 644b (e.g., between aperture 644b and the second opening 648) and the back opening 647 is located behind aperture 644b (e.g., between the first opening 646 and aperture 644b). Transfer line 640 also includes a tubular section 649 that connects the back opening 647 to the front opening 645. The tubular section 649 is configured to transfer cuttings and air from back opening 647 to front opening 649, thereby creating an alternate flow path for air and cuttings.

In select embodiments, transfer line 640 may include flow control devices 642 and 643, such as a gate valve, ball valve, check valve, or other flow control devices known in the art. The flow control devices 642, 643 may isolate part of transfer line 640 surrounding aperture 644b, thereby not allowing the solids released into the transfer line 640 to be transferred therethrough. For example, first flow control device 642 and second flow control device 643 may be closed, thereby causing the air flowing through transfer line 640 to flow through tubular section 649.

Referring back to FIG. 1, the air transfer device 150 is coupled to the first opening 146 of transfer line 140. The air transfer device 150 creates a zone of positive pressure inside transfer line 140 proximate the first opening 146. One skilled in the art will understand that the positive pressure provided by the air transfer device 150 is any pressure greater than the existing pressure within transfer line 140 prior to actuation of air transfer device 150. Accordingly, the positive pressure pushes air through transfer line 140, thereby causing the air to flow from the first opening 146 to the storage vessel 160. One skilled in the art will appreciate that the air transfer device 150 may include a compressor, a blower, or other positive pressure generating devices known in the art.

Storage vessel 160 includes an aperture 162 configured to provide fluid communication with transfer line 140. The location of aperture 162 is not limited to the top region of storage vessel 160. However, in certain embodiments, it may be advantageous to locate aperture 162 on top of storage vessel 160, such that cuttings may not migrate from storage vessel 160 back into transfer line 140. In one embodiment, the storage vessel 160 may include a pressure regulator (not shown), which regulates the pressure within storage vessel 160. The pressure regulator may be configured to keep the pressure inside storage vessel 160 lower then the pressure inside transfer line 140. As shown, storage vessel 160 is in fluid communication with transfer line 140 and configured to receive cuttings transported therethrough. For example, cuttings transported through transfer line 140 flow through aperture 162 and into the storage vessel 160. One skilled in the art will appreciate that storage vessel 160 may include storage bins, bagged storage, pressurized vessels (e.g., CleanCut® and ISO-Pump® products commercially available from M-I Swaco L.L.C., Houston, Tex.), or other storage types known in the art.

Figure 4:
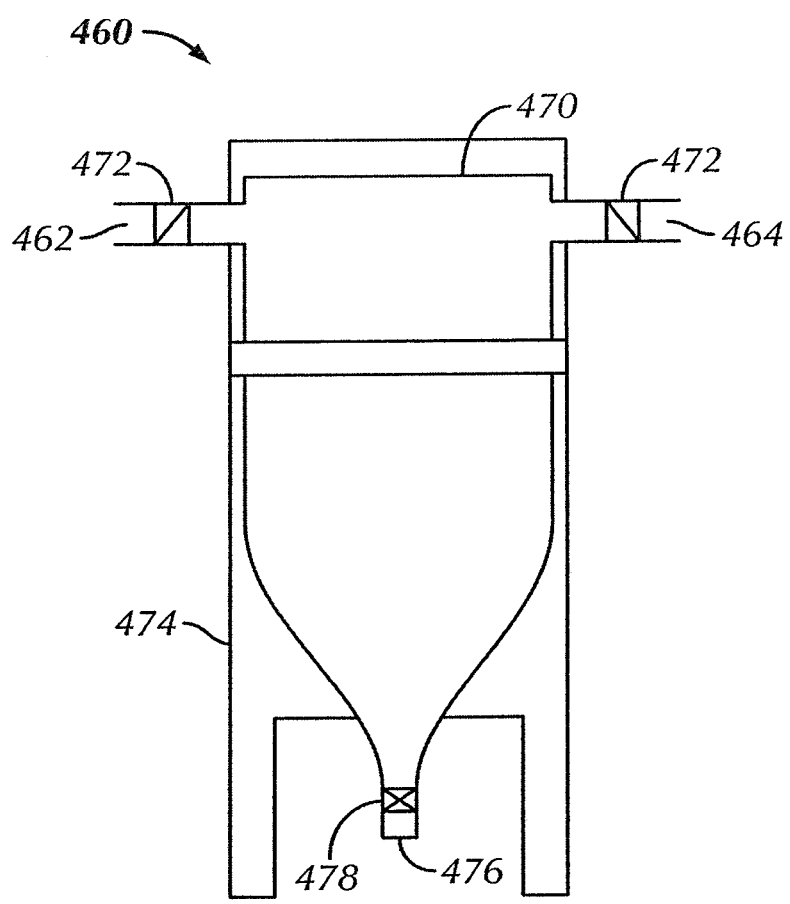
FIG. 4 shows a detail view of a storage vessel in accordance with embodiments of the present disclosure.

Referring now to FIG. 4, in one embodiment, the cuttings transfer system may include a storage vessel 460. Storage vessel 460 includes a pressurized vessel 470, a support frame 474, a first aperture 462, a second aperture 464, an outlet 476, and a plurality of valves 472. Support frame 474 may be coupled to pressurized vessel 470 and configured to hold pressure vessel 470 in a selected position. The first aperture 462 is configured to receive cuttings from a transfer line, similar to aperture 162 shown in FIG. 1. In one embodiment, second aperture 464 may be coupled to a second transfer line (not shown) and thereby allow cuttings to flow into the storage vessel 460. As such, cutting stored within the storage vessel may flow through outlet 476 and into a third transfer line (not shown), which may transport the cuttings to another storage vessel and/or another aspect of the drilling operation. Further, the plurality of valves 472 may be used to control the flow of air and/or cuttings into the storage vessel 460, and regulate the pressure within storage vessel 460. In certain embodiments, examples of pressurized storage vessels may include an ISO-Pump, commercially available from M-I Swaco, Houston, Tex. In still other embodiments, pressure storage vessels may include vessels with lower angled portions, internal baffles, internal honey-comb structures, multiple outlets, or other design features associated with pressure vessels known to those of skill in the art.

Referring back to FIGS. 1 and 2 together, during operation, separators 110 receive a slurry (i.e., return flow from a wellbore) and separate cuttings from the slurry. As the cuttings are separated from the slurry, the cuttings are discharged from separator 110 into the upper inlet 128 of valve 120. The cuttings then flow into pockets 132 of valve 120 that are formed between the vanes 124. While the cuttings flow into the pockets 132, the shaft 126 rotates the vanes 124 about axis 138, thereby transferring the cuttings from upper inlet 128 to lower outlet 130 of valve 120. Once the cuttings are transferred to the lower outlet 130, the cuttings are released from valve 120 and flow through an aperture into the transfer line 140. While the cuttings are released into the transfer line 140, air transfer device 150 provides a positive pressure inside transfer line 140, thereby pushing air through transfer line 140 towards the storage vessel 160. As a result, the air pushed through transfer line 140 forces the cuttings to flow through transfer line 140 and into the storage vessel 160.

Figure 5:
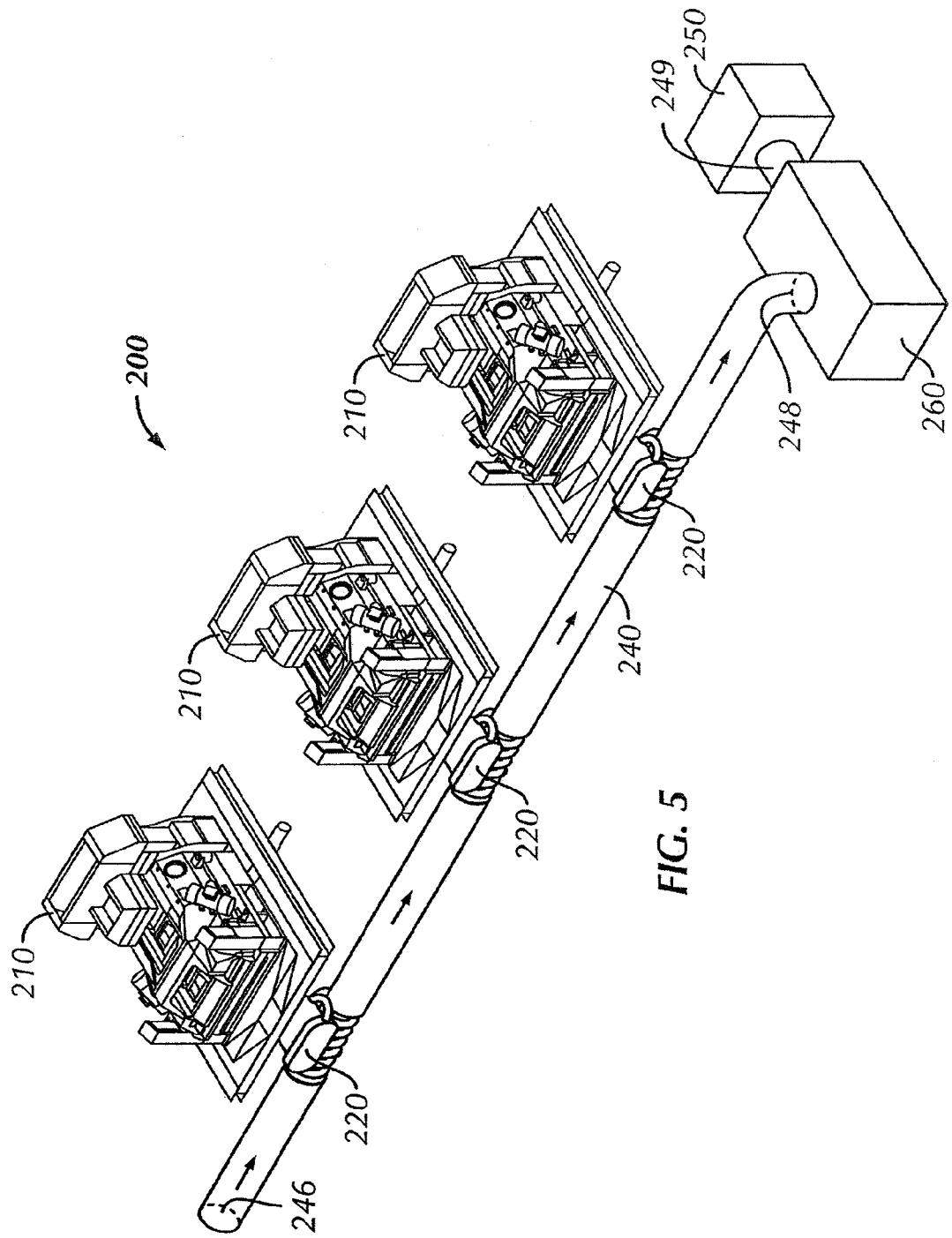
FIG. 5 shows a cuttings transfer system in accordance with embodiments of the present disclosure.

Referring now to FIG. 5, an alternate cuttings transfer system 200 in accordance with an embodiment of the present disclosure is shown. Similar to cuttings transfer system 100 shown in FIG. 1, cuttings transfer system 200 includes separators 210, valves 220, a transfer line 240, an air transfer device 250, and a storage vessel 260.

In this embodiment, the air transfer device 250 is coupled to a third opening 249 via the storage vessel 260 and the second opening 248 of the transfer line 240. As such, a first opening 246 is open to the atmosphere, and thereby allows air to flow into transfer line 240. Air transfer device 250 is configured to create a negative pressure inside transfer line 240 and storage vessel 260. One skilled in the art will appreciate that the negative pressure is any pressure less than the atmospheric pressure outside the transfer line 240. As such, the negative pressure provided by the air transfer device 250 pulls air through first opening 246 of transfer line 240, and causes the air to flow from first opening 246 via second opening 248 into storage vessel 260. The cuttings will fall out due to gravity into storage vessel 260 before air is evacuated through third opening 249 of air transfer device 250. One skilled in the art will appreciate that air transfer device 250 may include a vacuum, suction system, or other negative pressure generating device known in the art.

As shown in FIG. 5, cuttings transfer system 200 is used to separate and transfer solids 234 at a drilling location. During operation, separators 210 receive slurry (i.e., return flow from a wellbore) and separate cuttings from a drilling fluid. As the cuttings are separated from the slurry, the cuttings are discharged from the separator 210 into the upper inlet of valve 220. The cuttings then flow into pockets of valve 220 that formed between vanes. While the cuttings flow into pockets, the shaft rotates the vanes about the axis, thereby transferring the cuttings from the upper inlet to the lower outlet of valve 220. Once the cuttings are transferred to the lower outlet of valve 220, the cuttings are released and flow through an aperture into the transfer line 240. While the cuttings are released into the transfer line 240, air transfer device 250 provides a negative pressure inside the transfer line 240, which causes air to flow through first opening 246 and be pulled through the transfer line 240 towards the storage vessel 260. As a result, the air pulled through transfer line 240 forces the cuttings to flow through transfer line 240 and into storage vessel 260.

Figure 6:
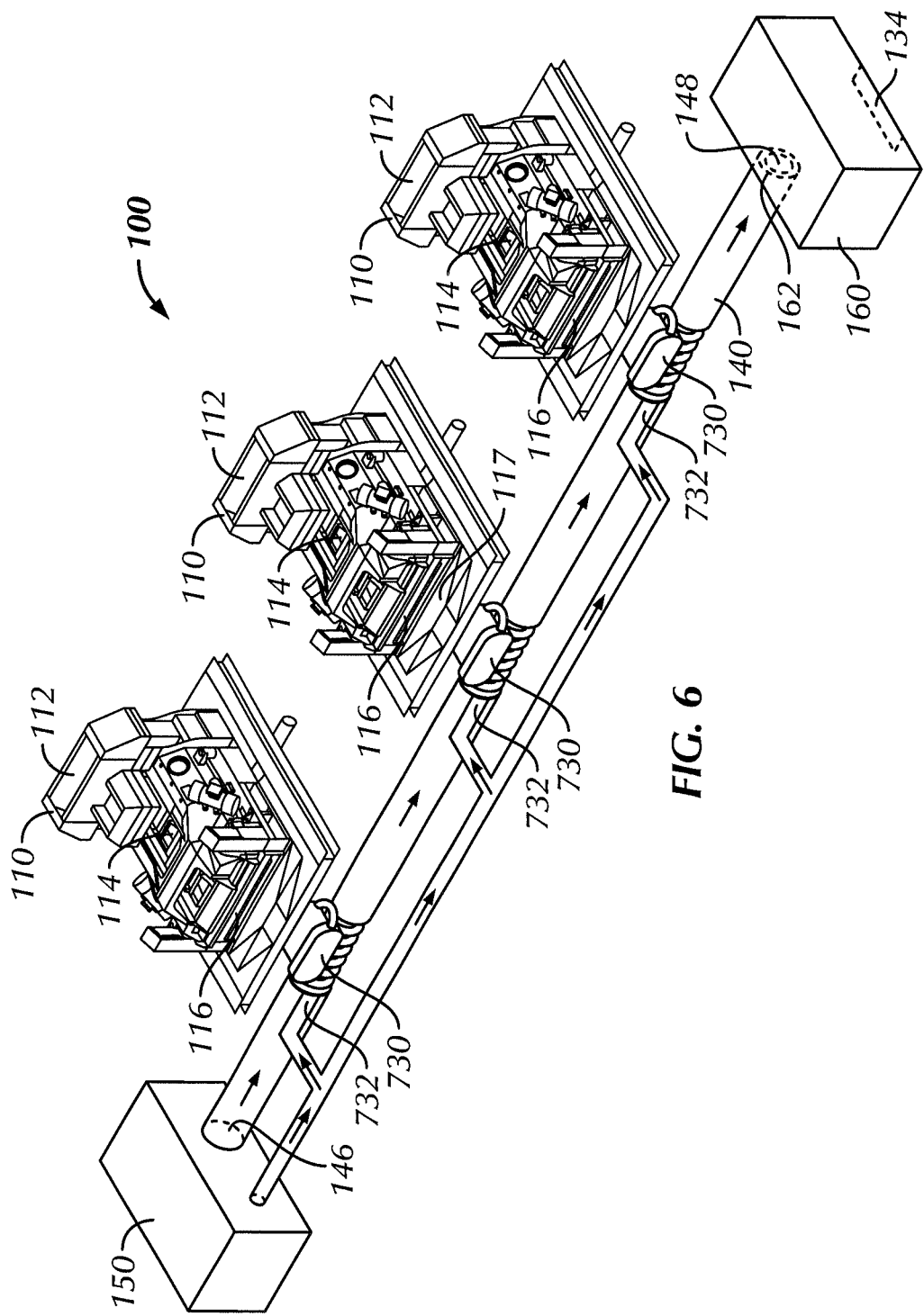
FIG. 6 shows a cuttings transfer system in accordance with embodiments of the present disclosure.

Referring to FIG. 6, a cuttings transfer system 100 in accordance with an embodiment of the present disclosure is shown. Cuttings transfer system 100 includes separators 110, blow-through valves 730, a transfer line 140, an air transfer device 150, and a storage vessel 160. The separators 110 are configured to receive a slurry including a liquid phase with a solid phase entrained therein. Further, separators 110 are configured to separate the cuttings from the slurry, and discharge the cuttings through blow-through valves 730 into transfer line 140.

A lower outlet 130 of blow-through valves 730 is coupled to transfer line 140. Additionally, upper inlet 128 of blow-through valves 730 is in fluid communication with separator 110, and is thus configured to receive cuttings from separator 110. For example, when separator 110 discharges cuttings 134, the flow of cuttings 134 is directed into upper inlet 128 of blow-through valves 730. In one embodiment, blow-through valves 730 may include a hopper 117 or other conduits known in the art that may direct cuttings into upper inlet 128.

Additionally, blow-through valves 730 is configured to control the flow of cuttings from the separator 110 to the transfer line 140. For example, cuttings 134 discharged from the separator 110 may flow through upper inlet 128 and be received by pockets 132 of blow-through valves 730. Shaft 126 and vanes 124 may then rotate, transferring the cuttings 134 to lower outlet 130 of blow-through valves 730, where cuttings 134 are released into an aperture in the transfer line 140. In one embodiment, the rate at which the cuttings 134 are released into transfer line 140 may be controlled by the rotational speed of the motor that is coupled to the shaft 126.

A transfer line 140 includes at least a first opening 146, apertures (not shown), and a second opening 148. In this embodiment, transfer line 140 is coupled to multiple valves 120, and second opening 148 is in fluid communication with storage vessel 160. In this embodiment, first opening 146 is coupled to air transfer device 150. One skilled in the art will appreciate that transfer line 140 may include various cross-sectional geometries and dimensions. For example, transfer line 140 may include a square cross-section, a rectangular cross-section, an elliptical cross-section, or other geometries known in the art.

Transfer line 140 is configured to receive cuttings released by blow-through valves 730, and provide a flow path for the cuttings from separator 110 to storage vessel 160. For example, as blow-through valves 730 releases cuttings 134 through the lower outlet 130, the cuttings 134 flow through an aperture (not shown) into transfer line 140. Then, air flowing through transfer line 140 will force the cuttings 134 through transfer line 140 and into storage vessel 160.

Cutting transfer system 100 also includes an air conduit 731 disposed adjacent transfer line 140 and configured to allow fluid communication from air transfer device 150 to blow-through valves 730. Air conduit 730 may thus be in direct fluid communication with air transfer device 150 such that between cycles of releasing cuttings into blow-through valves 730, air may be injected via air conduit 730 into blow-through valves 730. In certain embodiments, between blow-through valves 730 and air conduit 731, an air control valve 732 may be disposed. Air control valve 732 may open when blow-through valves 730 discharges cuttings to facilitate the removal of cuttings and/or other solid matter from blow-through valves 730. Those of ordinary skill in the art will appreciate that air control valve 732 may also be automated, such that each of the blow-through valves 730 are blown clean each time cuttings are discharged.

Referring to FIGS. 7A and 7B, front cross-sectional and isometric views, respectively, of a blow-through valve 730, according to embodiments of the present disclosure, are shown. In this embodiment, blow-through valve 730 includes a housing 122, vanes 124, a shaft 126, an upper inlet 128, and a lower outlet 130. The vanes 124 are coupled to the shaft 126, which is configured to rotate about an axis 138. In operation, the shaft 126 may be rotated by a motor (not shown), such that vanes 124 rotate about axis 138 in direction A. While the vanes 124 and shaft 126 rotate around axis 138, pockets 132 are formed between the vanes 124 and an inner wall 136 of housing 122. As such, pockets 132 are configured to provide a pathway for cuttings 134 to transfer from upper inlet 128 to lower outlet 130 of blow-through valve 730. Further, as shaft 126 and vanes 124 rotate, cuttings 134 within the pockets 132 are transferred to lower outlet 130. Those of ordinary skill in the art will appreciate that vanes 124 may be configured to allow a pressure differential to be sustained between the upper inlet 128 and the lower outlet 130. In certain aspects, vanes 124 may contact inner wall 136 of housing 122 while rotating, thereby creating a seal between upper inlet 128 and the lower outlet 130. In an alternate embodiment, one skilled in the art will appreciate that blow-through valve 730 may include a rotary feeder, or any other valve configured to control a flow of solids, while maintaining a pressure difference.

Blow-through valve 730 also includes an air conduit inlet 733 in fluid communication with an air conduit 731. An air control valve 732 may also be disposed between air conduit 731 and blow-through valve 730, such that during each discharge cycle, air may be injected into blow-through valve 730, thereby facilitating the discharge of solid matter therefrom. Such air injection may be provided by opening air control valve 732 during the discharge cycle, thereby forcing stuck solid material from pockets 132.

Figure 8:
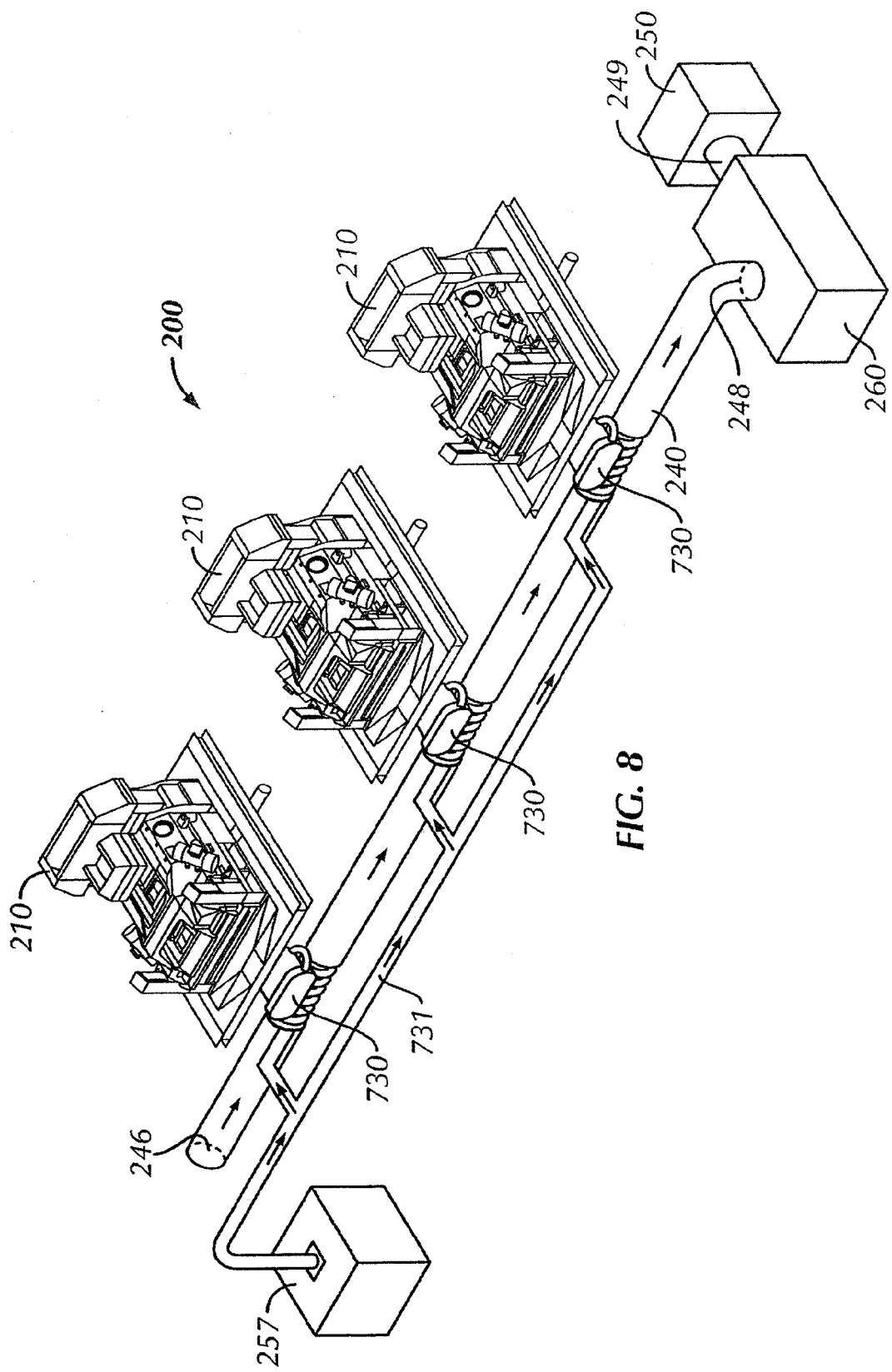
FIG. 8 shows a cuttings transfer system in accordance with embodiments of the present disclosure.

Referring to FIG. 8, a cuttings transfer system 200 in accordance with an embodiment of the present disclosure is shown. In this embodiment, an air transfer device 250 is coupled to a second opening 248 of a transfer line 240. As such, a first opening 246 is open to the atmosphere, and thereby allows air to flow into transfer line 240. Air transfer device 250 is configured to create a negative pressure inside transfer line 240. One skilled in the art will appreciate that the negative pressure is any pressure less than the atmospheric pressure outside the transfer line 240. As such, the negative pressure provided by the air transfer device 250 pulls air through first opening 246 of transfer line 240, and causes the air to flow from first opening 246 via second opening 248 to storage vessel 260. The cuttings will drop out due to gravity into storage vessel 260, while the air will evacuate through third opening 249 of the air transfer device 250. One skilled in the art will appreciate that air transfer device 250 may include a vacuum, suction system, or other negative pressure generating device known in the art.

During operation, separators 210 receive slurry (i.e., return flow from a wellbore) and separate cuttings from a drilling fluid. As the cuttings are separated from the slurry, the cuttings are discharged from the separator 210 into the upper inlet of a blow-through valve 730. The cuttings then flow into pockets of blow-through valve 730 that is between vanes (not illustrated). While the cuttings flow into pockets, the shaft rotates the vanes about the axis, thereby transferring the cuttings from the upper inlet to the lower outlet of blow-through valve 730. Once the cuttings are transferred to the lower outlet of blow-through valve 730, the cuttings are released and flow through an aperture into the transfer line 240. While the cuttings are released into the transfer line 240, air transfer device 250 provides a negative pressure inside the transfer line 240, which causes air to flow through first opening 246 and be pulled through the transfer line 240 towards the storage vessel 260. As a result, the air pulled through transfer line 240 forces the cuttings to flow through transfer line 240 and into storage vessel 260.

In this embodiment, cutting transfer system 200 also includes an air conduit 731 disposed adjacent transfer line 240 and configured to allow fluid communication from a second air transfer device 251 to blow-through valves 730. Examples of second air transfer devices 251 may include, for example, air compressors and/or existing rig air supply systems. Air conduit 730 may thus be in direct fluid communication with second air transfer device 251, such that between cycles of releasing cuttings into blow-through valves 730, air may be injected via air conduit 730 into blow-through valves 730. In certain embodiments, between blow-through valves 730 and air conduit 731, an air control valve 732 may be disposed. Air control valve 732 may open when blow-through valves 730 discharges cuttings to facilitate the removal of cuttings and/or other solid matter from blow-through valves 730. Those of ordinary skill in the art will appreciate that air control valve 732 may also be automated, such that each of the blow-through valves 730 are blown clean each time cuttings are discharged.

In select embodiments, the cuttings transfer system may include additional transfer lines, separators, valves, and/or storage vessels. The additional transfer lines may be used to transport solids discharged from the separators to the storage vessels, similar to the embodiments disclosed above. Furthermore, in select embodiments, the cuttings transfer system may include a plurality of air transfer devices that may be used to increase the amount of pressure provided to the cuttings transfer system, or to provide redundancy within the system, thereby increasing system reliability. For example, in the case that one of the air transfer device breaks down, a second air transfer device may be activated to continue the transportation of solids through the cuttings transfer system.

Embodiments of the present disclosure may include one or more of the following advantages. Cuttings transfer systems in accordance with one or more embodiments disclosed herein may use air to transfer cuttings at a drilling location. Cuttings transfer systems as disclosed herein may also be used to increase system reliability. Further, cuttings transfer systems disclosed herein may alleviate safety issues (e.g., the exposure of operators to moving parts).

Additionally, in select embodiments disclosed herein, a cuttings transfer system may used on an offshore rig to transfer cuttings (e.g., water based cuttings) directly overboard after the cuttings have been separated from a slurry. Furthermore, in certain embodiments, a cuttings transfer system may reduce down time on an offshore and/or land rig. For example, a cuttings transfer system may include additional components (e.g., a second air transfer device) that increase the reliability of the cuttings transfer system. As a result, the offshore and/or land rig may not have to shut down when a component (e.g., air transfer device) of the cuttings transfer system breaks down.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A cuttings transfer system comprising:
    a separator configured to separate cuttings from a slurry;
    a transfer line configured to receive the cuttings from the separator;
    a valve in fluid communication with the transfer line and the separator, wherein the valve is configured to control a flow of the cuttings from the separator to the transfer line; and
    an air transfer device coupled to the transfer line, and configured to supply a flow of air through the transfer line,
    wherein the system is configured to flow the cuttings from the separator directly to an inlet of the valve.

2. The cuttings transfer system of claim 1, wherein the cuttings transfer system further comprises a storage vessel configured to receive the cuttings from the transfer line.

3. The cuttings transfer system of claim 2, wherein the storage vessel comprises a pressurized vessel.

4. The cuttings transfer system of claim 1, wherein the air transfer device comprises at least one of an air compressor and a blower.

5. The cuttings transfer system of claim 1, wherein the air transfer device comprises a vacuum.

6. The cuttings transfer system of claim 1, wherein the separator comprises a vibratory separator.

7. The cuttings transfer system of claim 1, wherein the cuttings transfer system further comprises:
    a second separator configured to separate cuttings from the slurry; and
    a second valve in fluid communication with the transfer line and directly coupled to the second separator;
    wherein the second valve is configured to control the flow of cuttings from the second separator to the transfer line.

8. The cuttings transfer system of claim 1, wherein the valve is further configured to maintain a pressure inside the transfer line.

9. The cuttings transfer system of claim 1, further comprising a hopper disposed between the separator and the transfer line.

10. The cuttings transfer system of claim 1, wherein the transfer line further comprises a flow control device configured to isolate a portion of the transfer line.

11. The cuttings transfer system of claim 10, wherein the flow control device includes one of a gate valve, a check valve, and a ball valve.

12. The cuttings transfer system of claim 1, further comprising:
    an air conduit in fluid communication with the valve and configured to provide a flow of air to the valve.

13. A method of transferring cuttings at a drilling location, the method comprising:
    transferring a return slurry from a wellbore, the return slurry comprising a solids phase and a liquid phase;
    separating the solids phase from the liquid phase in a separator;
    directing the solids phase directly from the separator into a valve;
    releasing the solids phase from the valve into a transfer line via a pressure differential;
    creating a negative pressure inside the transfer line; and
    transporting the solids phase through the transfer line using the air flow.

14. The method of transferring cuttings at a drilling location of claim 13, wherein the method further comprises transporting the solid phase through the transfer line to a storage vessel configured to receive the solids phase from the transfer line.

15. The method of transferring cuttings at a drilling location of claim 13, wherein the method further comprises discharging the solids phase overboard.

16. The method of transferring cuttings at a drilling location of claim 13, further comprising:
providing a flow of air from an air conduit to the valve.

17. A method of transferring cuttings at a drilling location, the method comprising:
transferring a return slurry from a wellbore, the return slurry comprising a solids phase and a liquid phase;
separating the solids phase from the liquid phase in a separator;
directing the solids phase directly from the separator into a valve;
releasing the solids phase from the valve into a transfer line;
creating a positive pressure inside the transfer line; and
transporting the solids phase through the transfer line using the air flow through the transfer line.

18. The method of transferring cuttings at a drilling location of claim 17, wherein the method further comprises transporting the solids phase through the transfer line to a storage vessel configured to receive the solids phase from the transfer line.

19. The method of transferring cuttings at a drilling location of claim 17, wherein the method further comprises discharging the solids phase overboard.

20. The method of transferring cuttings at a drilling location of claim 17, further comprising:
providing a flow of air from an air conduit to the valve.

* * * * *